United States Patent
Laviolette

(10) Patent No.: US 8,352,947 B2
(45) Date of Patent: Jan. 8, 2013

(54) METHOD TO AUTOMATICALLY REDIRECT SRB ROUTINES TO A ZIIP ELIGIBLE ENCLAVE

(75) Inventor: Michel Laviolette, Cedar Park, TX (US)

(73) Assignee: BMC Software, Inc., Houston, TX (US)

( * ) Notice: Subject to any disclaimer, the term of this patent is extended or adjusted under 35 U.S.C. 154(b) by 535 days.

(21) Appl. No.: 12/565,549

(22) Filed: Sep. 23, 2009

(65) Prior Publication Data
US 2011/0072432 A1 Mar. 24, 2011

(51) Int. Cl.
*G06F 9/46* (2006.01)
(52) U.S. Cl. ............ 718/102; 710/36; 710/51; 711/169; 712/28; 712/31
(58) Field of Classification Search .................. None
See application file for complete search history.

(56) References Cited

PUBLICATIONS

IBM Readbooks (System programmer's guide to: Workload Manger, Mar. 2008).*
MVS (MVS details, Mar. 2009, http://testa.roberta.free.fr/My%20Books/Mainframe/jcl%20cobol%20tutorials/MVS_Details_-Part_I.pdf).*
Mainframe (http://www.mainframe.eu/mvs38/asm/Supervisor%20(IEA)/IEAVELCR : 2008).*
U.S. Appl. No. 12/582,296 Non-Final Office Action mailed Apr. 30, 2012, 25 pages.

* cited by examiner

Primary Examiner — Emerson Puente
Assistant Examiner — Sisley Kim

(57) ABSTRACT

A Method to redirect SRB routines from otherwise non-zIIP eligible processes on an IBM z/OS series mainframe to a zIIP eligible enclave is disclosed. This redirection is achieved by intercepting otherwise blocked operations and allowing them to complete processing without errors imposed by the zIIP processor configuration. After appropriately intercepting and redirecting these blocked operations more processing may be performed on the more financially cost effective zIIP processor by users of mainframe computing environments.

23 Claims, 4 Drawing Sheets

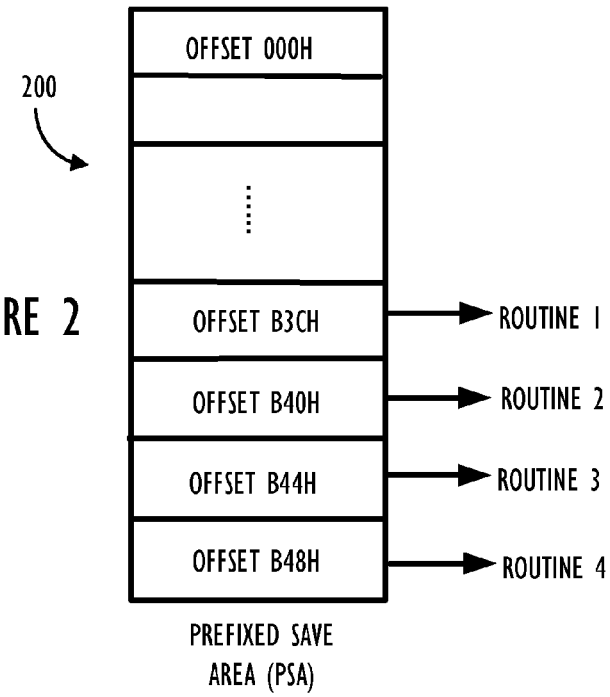
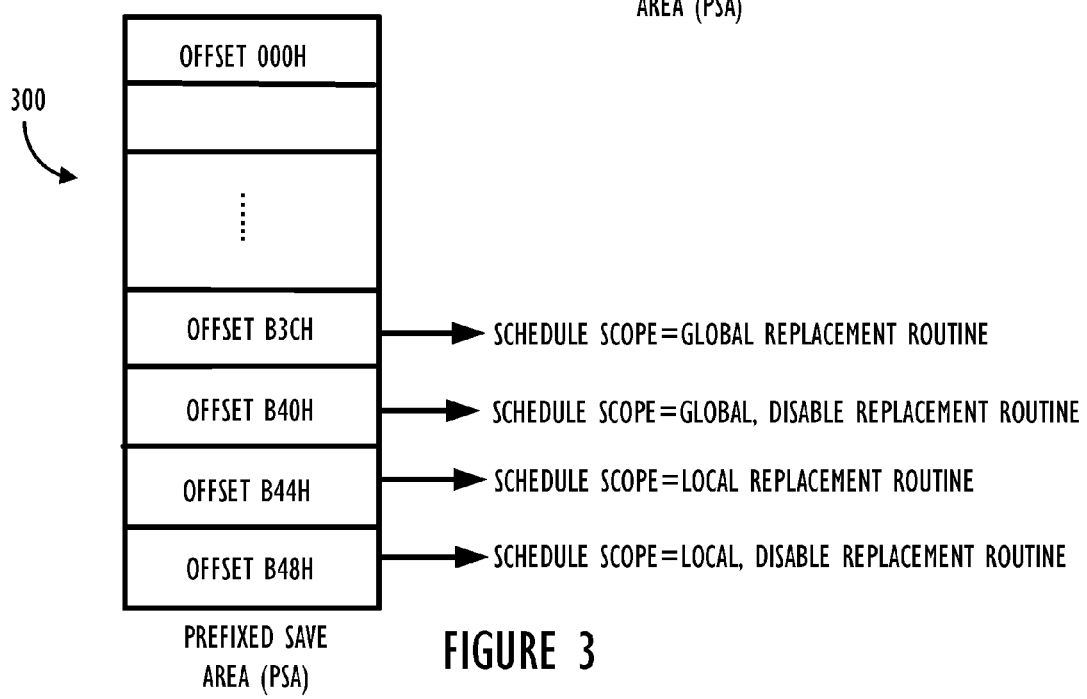

__US 8,352,947 B2__

METHOD TO AUTOMATICALLY REDIRECT SRB ROUTINES TO A ZIIP ELIGIBLE ENCLAVE

BACKGROUND

This disclosure relates generally to the field of mainframe software management. More particularly, but not by way of limitation, this disclosure refers to a method of redirecting SRB code from an otherwise zIIP in-eligible process such that the process may execute properly on the zIIP processor without incurring additional cost imposed by licensing agreements with International Business Machines Corp. (IBM) of Armonk N.Y. and/or other third party software vendors.

Referring now to FIG. 1, a high level block diagram of an IBM z series mainframe computer 100 is shown. The mainframe computer 100 consists of memory 110, a processor frame 115, a plurality of General Processors (GPs) 120, a plurality of System z Integrated Information Processors (zIIPs) 125, a channel unit 130 for processing Input/Output (I/O) requests, a connection to another mainframe 135 (which may be a network interface or some other communication link such as a communication buss), a tape storage unit 140, a telecommunications link 145 and a disk storage device 150 sometimes referred to as Direct Access Storage Device (DASD).

A single physical mainframe 100 may also be subdivided into multiple Logical Partitions (LPARs). A LPAR is a logical segmentation of a mainframe's memory and other resources that allows it to run its own copy of an operating system and associated applications. LPAR's may be enabled via special hardware circuits or purely through software. LPAR's may also allow multiple system images (of the same operating system or different operating systems) to run in one machine. Furthermore, each LPAR can execute one or more subsystems within an operating system. A subsystem is a service provider that performs one or more functions, but does nothing until it is requested. Examples of mainframe subsystems include Customer Information Control System (CICS), Information Management System (IMS), Resource Access Control Facility (RACF). When an LPAR is configured a system administrator may designate which physical hardware resources are available, either in whole or in part, to that particular LPAR.

In IBM System z9 and successor mainframes, the System z Integrated Information Processor (zIIP) is a special purpose processor intended to offload the General Processor (GP) of the mainframe computer system. These processors apparently do not contain microcode or hardware features that accelerate their designated workload. Instead, they are financially different in that they permit increasing system capacity for targeted workloads without raising z/OS and/or third party software license fees as would be the case if this workload was performed by the GP.

In order for a process to exploit the zIIP it must be specially coded. In addition to IBM certain third party software vendors (ISVs) have introduced support for execution of their products on the zIIP. The details of this are known to those of ordinary skill in the art and are not the topic of this disclosure.

Given these and other shortcomings, along with a potential financial benefit of utilizing the zIIP more generally, a method and system for implementing more general availability of the zIIP is disclosed. Furthermore, typical multi processing computers only include a plurality of a single type of processing unit or very different processing units. Therefore, software developers faced with not only technical but financial considerations may benefit from the embodiments disclosed herein.

SUMMARY

In one embodiment, the scheduling of SRB work is intercepted such that application programs are enabled to run on a more cost effective processor. The cost effective processor was previously unavailable to these application programs because of operating system limitations. After redirecting the SCHEDULE service code to a different implementation of a scheduling routine the operating system limitations are circumvented. If no cost effective processors are available for redirection then the application program may be directed back to the original processor for timely completion.

In another embodiment, a validation routine is run prior to redirecting application program requests such that only certain allowed application program requests may utilize the redirection.

BRIEF DESCRIPTION OF THE DRAWINGS

FIG. 2 shows, in block diagram form, an example of a Prefixed Save Area (PSA).

FIG. 3 shows, in block diagram form, one embodiment of intercepting otherwise non-eligible zIIP functions and redirecting them to a zIIP eligible enclave.

DETAILED DESCRIPTION

Figure 1:
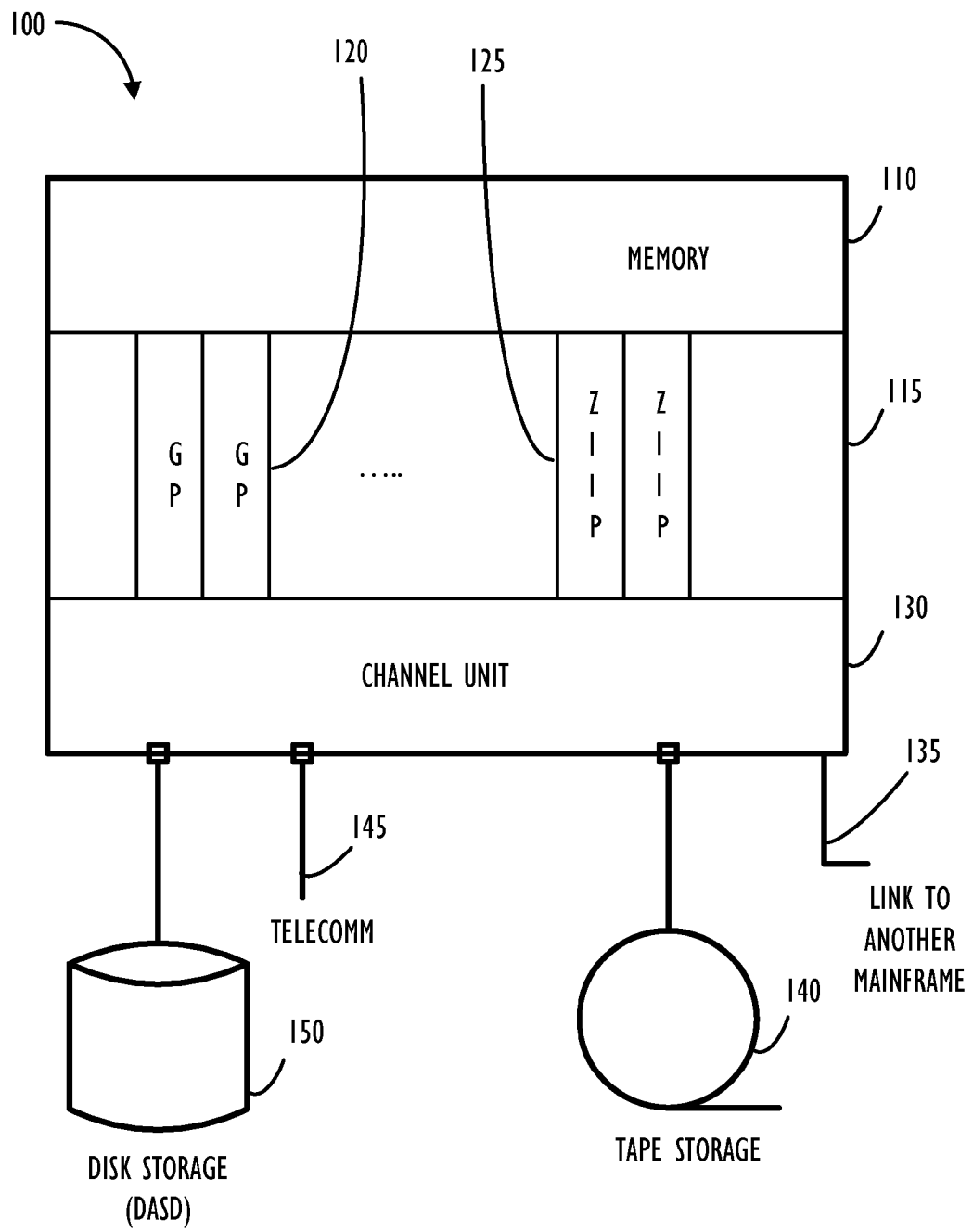
FIG. 1 shows, in block diagram form, an exemplary IBM mainframe with GP processors and zIIP processors.

Methods and systems to redirect workload from a GP to a zIIP within an IBM z series architecture are disclosed. An IBM z series mainframe may contain a plurality of processing units. The General Purpose (GP) processor has a run-time cost associated with the amount of workload it performs. Workload and capacity of a system is generally measured in MIPS (Millions of Instructions Per Second). Based on the amount of purchased or licensed capacity the capacity of the GP may be "throttled down" such that it is not running at the top of its technically available processing capability. A z/Series mainframe may also include a z/Architecture Integrated Information Processor (zIIP). The business model surrounding the zIIP allows processors of this type to run either for free or at a fraction of the price of the GP. The zIIP is typically configured to run at its full speed because the pricing structure does not directly depend on the throughput of this type of processor. Instead, IBM introduced a proprietary interface that allows only workloads meeting a specific criteria to execute properly on this processor. Details of this criteria are discussed further below. The actual implementation process to meet this criteria are known to those of ordinary skill in the art and therefore do not require further discussion.

There are currently two types of workload, sometimes referred to as units of work (UOW), in one operating system of the z/Series mainframe z/OS. These two types of workload are referred to as Service Request Block (SRB) and Task Control Block (TCB). Typically about ten percent of the workload in a typical mainframe is SRB with the remaining ninety percent being TCB. An enclave is a logical collection of various UOWs (TCBs and/or SRBs) represented by one or more Enclave Control Blocks (ENCBs). Upon creation of each enclave a unique eight byte token is generated and used by the operating system and applications for identifying the enclave.

A GP is available to run all workloads (e.g., TCB or SRB) while the z/OS operating system will only run SRB type workloads on a zIIP. Additionally, the z/OS operating system will only consider SRB's that are part of an enclave and only enclaves that conform to IBM's proprietary interface to be eligible for zIIP execution. Each of the GP and zIIP may be required to perform work that will be run in SRB mode.

In z/OS there are currently two ways to schedule work described by an SRB. These are the "SCHEDULE" service and the "IEAMSCHD" service. The SCHEDULE service cannot create an SRB to be part of an enclave and therefore cannot execute on a zIIP because of the restrictions discussed above. In contrast, the IEAMSCHD service can create an SRB to be part of an enclave and may execute on a zIIP. Various components of z/OS use the SCHEDULE service, therefore these SRBs are not eligible to run on a zIIP.

Each instance of the z/OS on a mainframe has a Prefixed Save Area (PSA) for each processing unit. The PSA contains pointers to operating system functions at known locations in the PSA relative to starting address 0H. As shown in FIG. 2 "routine 1" is registered at address offset B3CH, "routine 2" is registered at address offset B40H, "routine 3" is registered at address offset B44H, and "routine 4" is registered at address offset B48H. These offsets are typically not changed once defined because of the impact this may have on existing applications (e.g., existing applications may have to be re-compiled etc.). Also, recall that a mainframe operating system may also be executing in an LPAR. In this case the instance of the operating system may have only partial use of a physical CPU and therefore will require a PSA for this "partial CPU." For example, the processors are considered to be "logical CPUs" and a physical CPU may be shared between LPARS. If there are two LPARs defined across five physical processors, three of which are GPs and the other two are zIIPs and a first LPAR was defined to have 2.5 physical GPs and 1.5 zIIPs then the second LPAR would have 0.5 GPs and 0.5 zIIPs. In this example there would be a total of five PSAs on the first LPAR and two PSAs on the second LPAR. Each physical processor or portion of a physical processor requires its own PSA.

The z/OS operating system also has nucleus-resident routines. These routines are very low level operating system routines which execute from protected memory. One example of a nucleus-resident routine is IEAVELKR. The IEAVELKR routine "knows" the address of other routines stored in the PSA. As mentioned above, each physical processor or portion of a physical processor must have its own PSA but there is only one copy of the z/OS nucleus resident routines required in memory. Each of the processors will share access to the protected memory area.

Referring now to FIG. 3, block diagram 300 shows how the current PSA offsets for the four routines (i.e., SCHEDULE SCOPE=GLOBAL; SCHEDULE SCOPE=GLOBAL,DISABLE; SCHEDULE SCOPE=LOCAL; SCHEDULE SCOPE=LOCAL,DISABLE) to be replaced could be changed to point to a replacement routine. Currently, the PSA offset in z/OS to the SCHEDULE SCOPE=GLOBAL,DISABLE routine is B40H, the offset to the SCHEDULE SCOPE=LOCAL routine is B44H, the offset to the SCHEDULE SCOPE=LOCAL, DISABLE routine is B48H, and the offset to the SCHEDULE SCOPE=GLOBAL routine is B3CH. At each of these defined offsets is an address pointer which points to an entry point for each respective routine. In one embodiment, the pointers at each of these locations is saved and replaced with a pointer to an intercept routine. Each intercept routine has the above mentioned attributes for the routine it is "replacing." Each of the four intercept routines can dynamically intercept the SCHEDULE invocation and redirect that invocation to an IEAMSCHD invocation. When the redirection takes place each request is linked, via the unique 8 byte token described above, to a created enclave. Each created enclave associated with the redirection techniques disclosed herein is a server address space and has been designed such that it is zIIP eligible. Because the redirection techniques disclosed herein use IEAMSCHD with the enclave option they make an SRB routine eligible to be dispatched on a zIIP. By redirecting these requests, otherwise non zIIP eligible process may be able to execute on a zIIP processor for reduced run-time cost without actually changing the application code associated directly with the process. Note, that the z/OS dispatcher will favor a zIIP for a zIIP eligible process, but if no zIIPs are configured or if all zIIPs are busy with other work then the dispatcher may chose a general processor. Also note, each PSA associated with a logical CPU should be updated for consistency within a given instance of z/OS.

Additionally, the nucleus-resident routine IEAVELKR "knows" of the addresses stored in the PSA at 0B3CH, 0B40H, 0B44H, and 0B48H so any attempt to modify these addresses may not have a lasting effect because the modification may be overwritten by IEAVELKR. In order to properly change the pointers in the PSA, IEAVELKR memory should also be changed. However, as mentioned above, nucleus-resident routines execute from write protected memory. z/OS read-only nucleus resident routines are protected from modification by setting a "page protect" bit after the nucleus ("kernel") is loaded. This bit is examined by the hardware when an attempt is made to modify the contents of the page. If the bit is on, then the operation fails. The z/OS PGSER PROTECT/UNPROTECT service provides a way to set/reset this bit. The starting and ending storage addresses are passed to the service and the protect bit for each page in the range is set or reset.

One example method of "patching" IEAVELKR is to obtain the address and length of IEAVELKR using the publicly documented IBM NUCLKUP service. Next, the memory storing the IEAVELKR routine may be searched for the matching values from offsets B3CH, B40H, B44H, and B48H in the PSA. Once found, the memory pages corresponding to these locations are "unlocked" using the IBM PGSER UNPROTECT service. The fields within the IEAVELKR memory are replaced with the addresses of the replacement routines. Finally, the memory pages are re-locked using the IBM PGSER PROTECT service. This patching should be done before updating the pointers within each PSA because of obvious timing reasons.

In another embodiment, a level of security or validation may be coded into the intercept routines. This may be used, for example, to only allow certain applications to utilize the intercept routines disclosed herein. Those applications or processes not passing this validation step may be re-directed back to the original routines via the previously saved address pointers.

Figure 4:
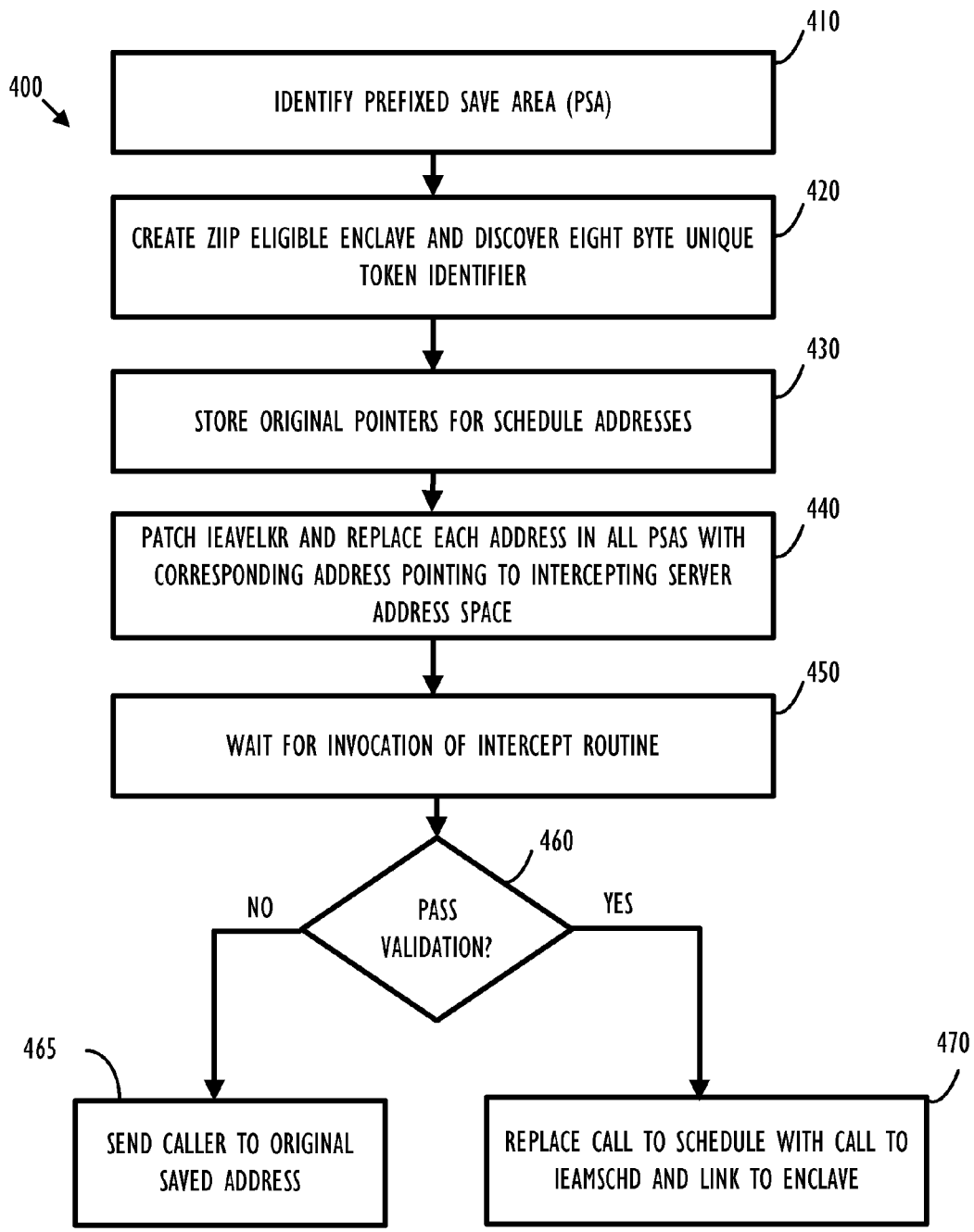
FIG. 4 shows, in flow chart form, an example workflow to intercept functions from a non-zIIP eligible mainframe computer process and allow its execution to perform on the zIIP without changing the processes code or recompilation of the application representing the process.

Referring now to FIG. 4, process 400 is shown in flow chart form. In this embodiment, an example workflow for intercepting functions from a non-zIIP eligible mainframe computer process and allowing for its execution on the zIIP without changing the processes code or recompilation of the application representing the process is shown. At block 410 the Prefixed Save Area (PSA) is identified for each logical CPU in this instance of z/OS. Next, at block 420, a zIIP eligible enclave is created and the unique eight (8) byte identifier is created by the operating system. Block 430 represents the saving of the original pointers to the aforementioned SCHEDULE routines. At block 440, the addresses for the replacement routines are "patched" into nucleus resident routine IEAVELKR and are written to each PSA at the appropriate offset address. When a requesting process invokes the replacement code (block 450) validation may be performed (460). Upon failure of validation the requesting process may be passed to the original z/OS routines as if nothing has been changed (block 465). Alternatively, if the validation (460) is successful then redirection to the replacement routines can allow this process to run on a zIIP rather than a GP.

Figure 5:
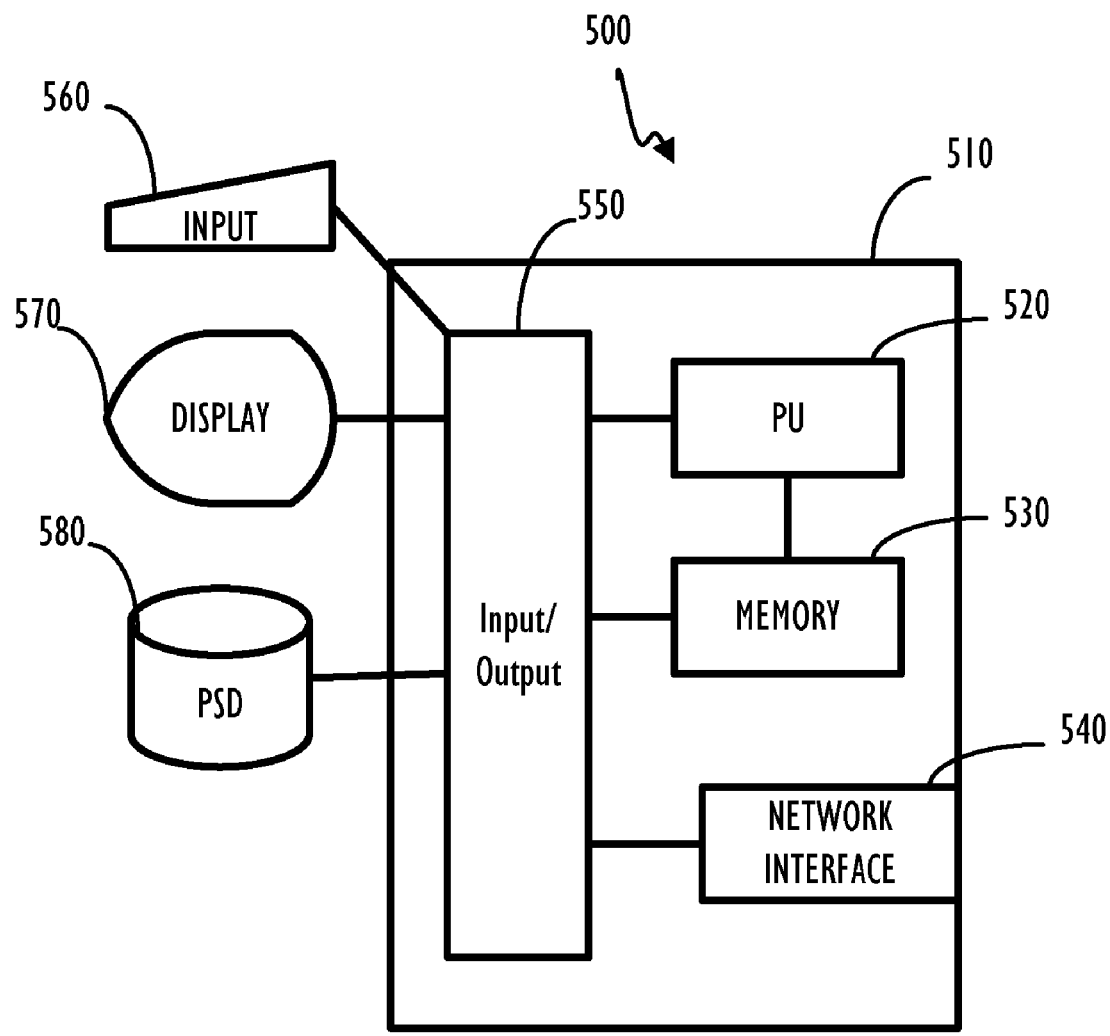
FIG. 5 shows, in block diagram form, an exemplary computing device comprised of a program control device.

Referring now to FIG. 5, an exemplary computing device 500 is shown. One or more exemplary computing devices 500 may be included in a mainframe computer (not shown). Exemplary computing device 500 comprises a programmable control device 510 which may be optionally connected to input 560 (e.g., keyboard, mouse, touch screen, etc.), display 570 or program storage device (PSD) 580 (sometimes referred to as a direct access storage device DASD). Also, included with program device 510 is a network interface 540 for communication via a network with other computing and corporate infrastructure devices (not shown). Note network interface 540 may be included within programmable control device 510 or be external to programmable control device 510. In either case, programmable control device 510 will be communicatively coupled to network interface 540. Also note, program storage unit 580 represents any form of non-volatile storage including, but not limited to, all forms of optical and magnetic storage elements including solid-state storage.

Program control device 510 may be included in a computing device and be programmed to perform methods in accordance with this disclosure (e.g., those illustrated in FIG. 4). Program control device 510 comprises a processor unit (PU) 520, input-output (I/O) interface 550 and memory 530. Processing unit 520 may include any programmable controller device including, for example, processors of an IBM mainframe (such as a quad-core z10 mainframe microprocessor). Alternatively, in non mainframe systems examples of processing unit 520 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 530 may include one or more memory modules and comprise random access memory (RAM), read only memory (ROM), programmable read only memory (PROM), programmable read-write memory, and solid state memory. One of ordinary skill in the art will also recognize that PU 520 may also include some internal memory including, for example, cache memory.

Aspects of the embodiments are described as a method of control or manipulation of data, and may be implemented in one or a combination of hardware, firmware, and software. Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIG. 4 may perform the identified steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIG. 4 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of patching a mainframe operating system controlling a mainframe computer, the method comprising:
    obtaining an address range in memory for a nucleus-resident IEAVELKR routine;
    unlocking one or more pages of memory in the obtained address range by turning off a page protect bit corresponding to the one or more pages of memory;
    searching the obtained address range for pointers to SCHEDULE service code;
    updating the pointers to the SCHEDULE service code in the nucleus-resident IEAVELKR routine to point to an intercept routine; and
    updating a prefixed save area (PSA) with a pointer to the intercept routine substitute SCHEDULE service.

2. The method of claim 1 further comprising locking the one or more pages of unlocked memory.

3. The method of claim 1 wherein the mainframe operating system is z/OS.

4. The method of claim 1 wherein the PSA is associated with a logical CPU and the method further includes performing the updating for each PSA associated with the logical CPU.

5. The method of claim 1 further comprising making SRB code eligible to run on a more cost effective hardware processor of the mainframe computer.

6. The method of claim 5 wherein the more cost effective hardware processor is a zIIP.

7. The method of claim 1 wherein the intercept routine includes an interface to an IEAMSCHD service.

8. A non-transitory computer-readable medium with instructions embodied thereon to cause a programmable control device to perform the method of claim 1.

9. The method of claim 7, wherein the intercept routine comprises validation code that directs invocations of the SCHEDULE service code to either the SCHEDULE service code or to the IEAMSCHD service.

10. A mainframe computer comprising:
- an operating system, including a nucleus-resident IEAVELKR routine;
- one or more intercepting routines configured to replace SCHEDULE service code; and
- a plurality of hardware processors,
- wherein the mainframe computer is configured to:
  - obtain an address range in memory for the IEAVELKR routine,
  - unlock one or more pages of memory in the obtained address range by turning off a page protect bit corresponding to the one or more pages of memory,
  - search the obtained address range for pointers to the SCHEDULE service code,
  - update the pointers to the SCHEDULE service code in the nucleus-resident IEAVELKR routine to point to the one or more intercepting routines, and
  - replace pointers to the SCHEDULE service code in a prefixed save area (PSA) with pointers to the intercept routines.

11. The mainframe computer of claim 10, wherein the mainframe computer is further configured to lock the one or more pages of unlocked memory by turning the page protect bit on after updating the pointers to the SCHEDULE service code.

12. The mainframe computer of claim 10 wherein the operating system is z/OS.

13. The mainframe computer of claim 10 wherein the PSA is associated with a logical CPU and the mainframe computer is further configured to perform the updating for each PSA associated with the logical CPU.

14. The mainframe computer of claim 10, wherein updating the pointers results in making SRB code originally ineligible to run on a more cost effective hardware processor of the mainframe computer eligible to run on the more cost effective hardware processor.

15. The mainframe computer of claim 14 wherein the more cost effective hardware processor is a zIIP.

16. The mainframe computer of claim 10 wherein the intercept routine includes an interface to an IEAMSCHD service.

17. The mainframe computer of claim 16, wherein the intercept routine comprises validation code that directs invocations of the SCHEDULE service code to either the SCHEDULE service code or to the IEAMSCHD service.

18. A method of patching a mainframe operating system controlling a mainframe computer, the method comprising:
- identifying a prefix save area (PSA);
- determining original pointers to SCHEDULE service code in the PSA;
- obtain an address range in memory for a nucleus-resident IEAVELKR routine;
- unlocking one or more pages of memory in the obtained address range by turning off a page protect bit corresponding to the one or more pages of memory;
- searching the obtained address range for the pointers to the SCHEDULE service code;
- updating the pointers to the SCHEDULE service code in the nucleus-resident IEAVELKR routine to point to one or more intercept routines; and
- updating a prefixed save area (PSA) with the pointers to the one or more intercept routines.

19. The method of claim 18, wherein the intercept routines comprise validation code.

20. The method of claim 19, wherein the method further includes:
- validating an application that invoked the SCHEDULE service code;
- directing the application to the original pointers to SCHEDULE service code when the application does not pass validation; and
- directing the application to IEAMSCHD service code when the application does pass validation.

21. The method of claim 18 further comprising creating a zIIP eligible enclave.

22. The method of claim 21 wherein the method includes associating the enclave with the one or more intercept routines.

23. The method of claim 18 wherein the PSA is associated with a logical CPU and the method further comprises updating each PSA with the pointers to the one or more intercept routines.

* * * * *

UNITED STATES PATENT AND TRADEMARK OFFICE
CERTIFICATE OF CORRECTION

PATENT NO. : 8,352,947 B2
APPLICATION NO. : 12/565549
DATED : January 8, 2013
INVENTOR(S) : Michel Laviolette Page 1 of 1

It is certified that error appears in the above-identified patent and that said Letters Patent is hereby corrected as shown below:

In column 6, line 63, in claim 1, after "routine" delete "substitute SCHEDULE service".

Signed and Sealed this
Nineteenth Day of March, 2013

Teresa Stanek Rea
*Acting Director of the United States Patent and Trademark Office*